No. 798,739. PATENTED SEPT. 5, 1905.
G. MACHLET.
FURNACE.
APPLICATION FILED APR. 13, 1905.
4 SHEETS—SHEET 3.
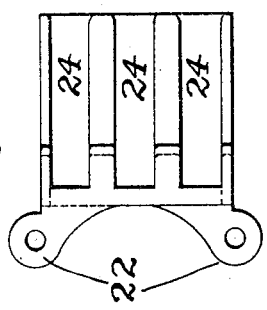
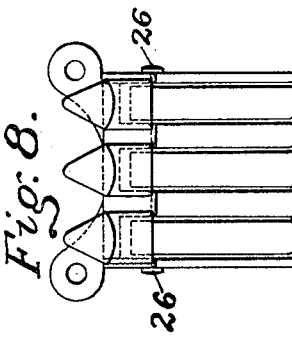
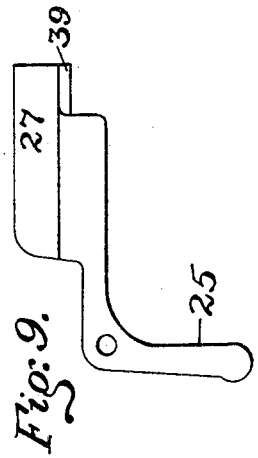
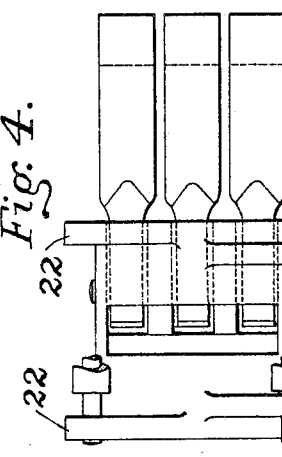
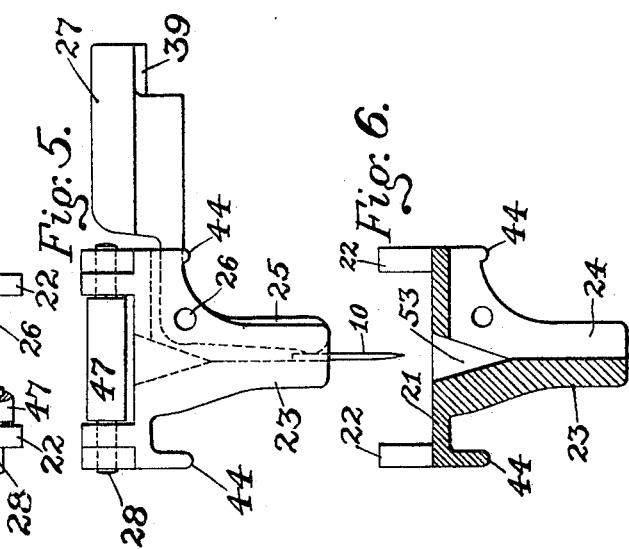
WITNESSES:
Philip O. Osterman
Geo. L. Hirtzel Jr.
INVENTOR
George Machlet
BY
B. C. Stickney
ATTORNEY

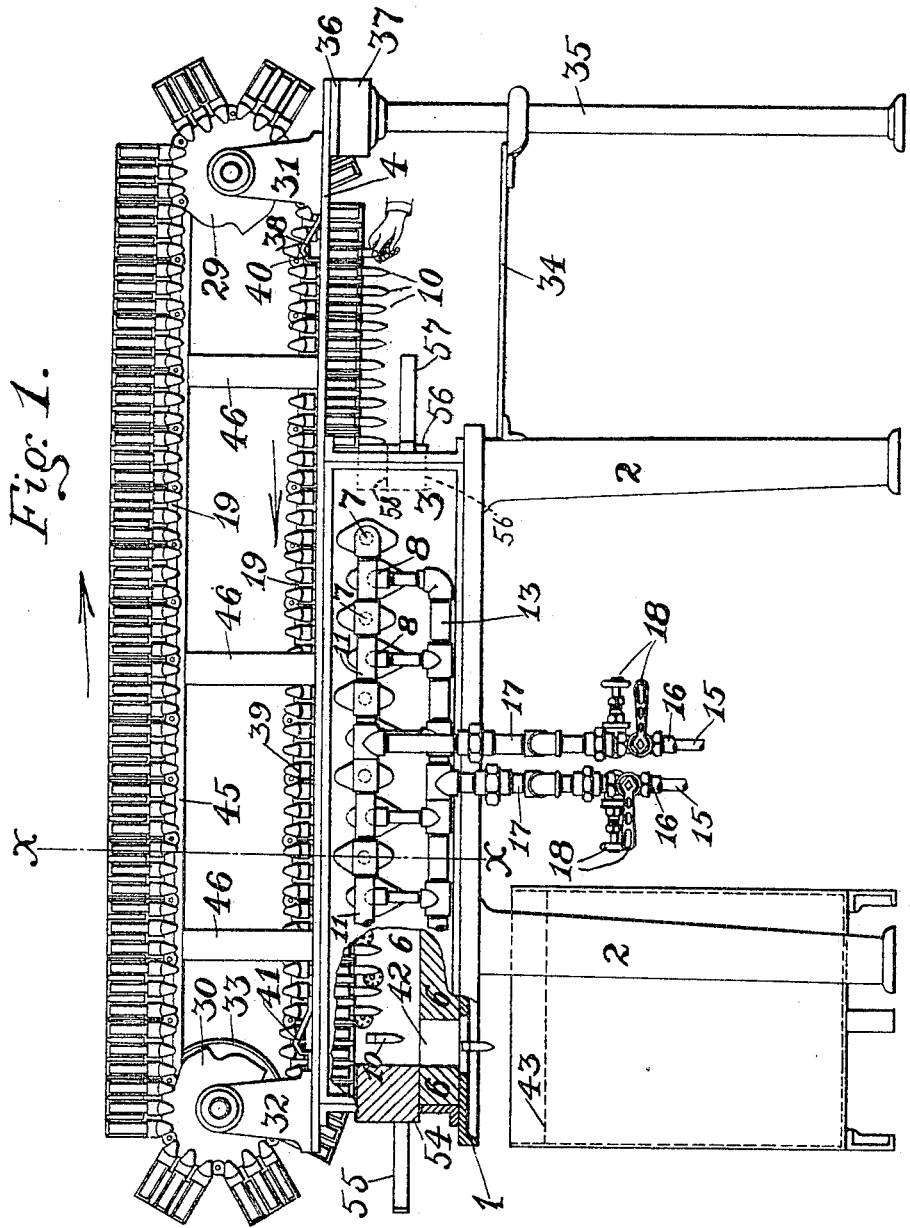

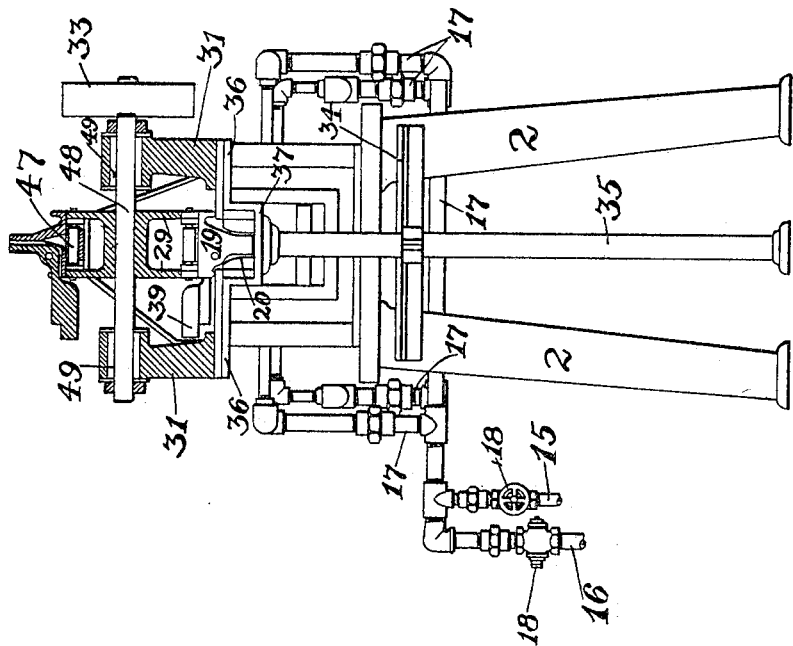
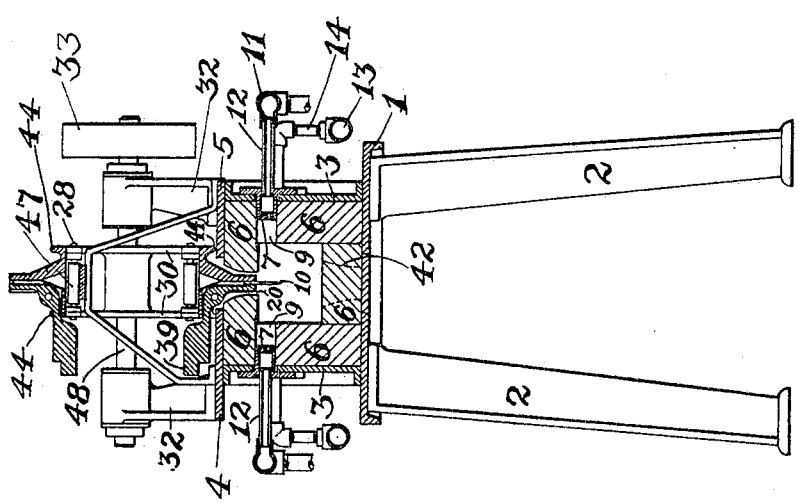

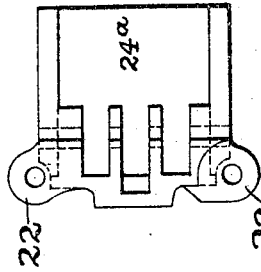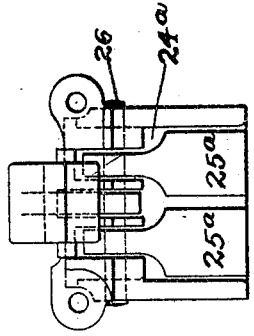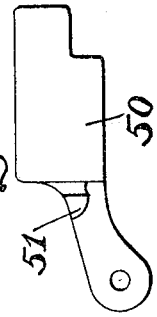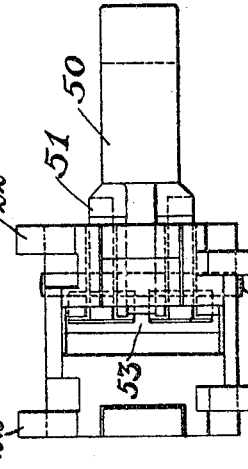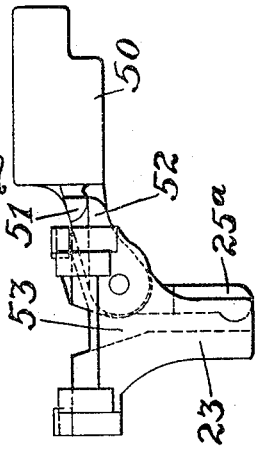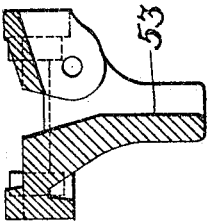

UNITED STATES PATENT OFFICE.

GEORGE MACHLET, OF ELIZABETH, NEW JERSEY.

FURNACE.

No. 798,739.  Specification of Letters Patent.  Patented Sept. 5, 1905.

Application filed April 13, 1905. Serial No. 255,288.

*To all whom it may concern:*

Be it known that I, GEORGE MACHLET, a citizen of the United States, residing in Elizabeth, in the county of Union and State of New Jersey, have invented certain new and useful Improvements in Furnaces, of which the following is a specification.

This invention relates to means for heating small metal articles—such as knife or other blades, plane-irons, &c.—and may be used in annealing, tempering, forging, and other operations.

The object of the invention is to provide a simple and inexpensive apparatus, compact, easily managed, and not liable to get out of order, for uniformly heating small articles in large quantities at a minimum cost for fuel and labor.

In carrying out my invention in its preferred form I employ a box-like furnace using such fuel as gas mixed with air, and through the upper part of said furnace I cause the knife-blades or other articles to travel while the flames play upon them. The articles are released as soon as properly heated and allowed to fall into a tempering-bath or any other suitable receptacle. The articles are carried through the furnace by means of an endless chain, each link preferably provided with several clips, so that either one or several articles may be held by each link. The clips open automatically as they approach the furnace, permitting the insertion of the articles one by one, and then close automatically upon the articles to hold them while being heated. The top of the furnace I provide with a slot, through which the lower portions of the links travel, and at the ends of the furnace I provide sprockets over which the chain turns, so that during their return movement the links stand above the furnace, thus minimizing floor-room, the apparatus being very compact in proportion to its efficiency. I provide for inserting the articles either upwardly or downwardly into the clips, as may be desired, and illustrate herewith how either one large article or several small articles may be held by each link of the chain, as may be desired, thus giving the apparatus a wide range of usefulness. I construct the chain so that it almost fills the slot in the top of the furnace, thus confining the flames within the fire-chamber, and consequently economizing fuel. The several moving parts act freely in spite of their heated condition, while the entire apparatus is simple of construction and readily put together and disassembled, the parts being also readily accessible for inspection, cleaning, &c. In operating the apparatus it is only necessary to pick up the articles one by one and insert them between the open jaws of the clips, which close automatically. This operation can be performed easily and quickly and by unskilled labor, so that the articles are heated at very small cost.

Other objects and advantages will hereinafter appear.

In the accompanying drawings, Figure 1 is a side elevation, partly in section, of a furnace and its appurtenances constructed according to my invention. Fig. 2 is a sectional end elevation of the apparatus, taken at about the line X X of Fig. 1. Fig. 3 is an end elevation, certain parts being shown in section. Figs. 4 to 9 are detailed views of one of the links and its appurtenances seen at Fig. 1. Fig. 4 is a plan. Fig. 5 is an end elevation of the parts seen at Fig. 4. Fig. 6 is a transverse section of a link. Fig. 7 is a side elevation of a link. Fig. 8 is a side elevation of the parts seen at Fig. 5. Fig. 9 is a side elevation of a pivotal clip member provided with an integral weighted arm. Figs. 10 to 16 show details of a modified link and clips. Fig. 10 is a plan of a link with its clips. Fig. 11 is an end elevation. Fig. 12 is a cross-section of the link. Fig. 13 is an elevation of a pivotal clip member. Fig. 14 is a side elevation of the link. Fig. 15 is a side elevation of the parts seen at Fig. 11. Fig. 16 is a pivotal weight to coöperate with the clip member seen at Fig. 13.

The furnace comprises a base-plate 1, supported upon legs 2 and having side walls 3 and top plates 4 5 and in the form of a long box, provided throughout with a refractory lining 6, which incloses the fire-chamber. The heat is supplied by a double row of burners let into each side of the furnace, each double row consisting of an upper and a lower tier, the burners 7 in the upper tier alternating with the burners 8 in the lower tier. The several burners are set in orifices 9, formed in the refractory lining, so that the flames are directed across the fire-chamber at the upper part thereof, so as to act directly upon the knife-blades or other articles 10 that are to be heated.

Upon each side of the furnace is arranged an upper main 11, which is on a level with the burners 7 and connected directly thereto by short horizontal pipes or connections 12.

A lower main 13 upon each side of the furnace is connected by elbows 14 with the lower tier of burners 8. Each main is provided with a gas-supply 15 and an air-supply 16, the mixture of air and gas passing into the mains through pipes 17. Each of the upper and lower pairs of mains is provided with valves 18 to regulate the supply of gas and air and also to enable the attendant to throw out of use either the upper tiers or the lower tiers of burners.

As seen at Fig. 1, the articles 10 to be heated are inserted one by one between the jaws of clips that are provided upon the links 19 of an endless chain, which is so mounted over the furnace that the clips extend down into a slot 20, the latter formed in the top of the furnace and extending the entire length thereof. Each link is preferably in the form of a plate 21, having at each end a pair of upwardly-projecting ears 22, whereby the links are connected, and also having an integral projection or plate 23 to extend down into the slot 20 of the furnace. Said projection 23 is formed with three recesses 24 to receive clip members or jaws 25, all of which are pivoted upon the link by means of a pin 26. Said jaw 25 is formed with a integral weighted arm 27, which overhangs the top of the furnace and presses said jaw 25 toward the portion 23 of the link, so as to bite the part 10, which is to be heated. The links are connected by pins 28 to form the chain, which runs over sprockets 29 and 30, journaled in brackets 31 and 32, secured upon the top plates 4 and 5 of the furnace, the sprocket 30 being provided with a worm-wheel or pulley 33 or other suitable device for giving a slow movement to the chain.

The articles to be heated may be placed upon a table 34, which is seen at the right of Fig. 1, supported partly upon the adjoining legs 2 and partly upon a standard 35, the latter also supporting extensions of the plates 4 5, and being for this purpose provided with a cross-bar 36, upon which the plates 4 5 rest, said bar 36 having a depressed portion 37 to clear the links and to rest upon the top of the standard 35.

Between the idle sprocket 29 and the adjoining end of the furnace is fixed an inclined cam or trip 38 in the path of projections 39, formed upon the ends of the weighted arms 27, these projections riding upon said cam, so that said arms are lifted automatically one by one by reason of the traveling movement of the chain, as seen at Fig. 1, thereby opening the clip 25 to permit the blade or other part 10 to be inserted. The arm is preferably let down again gradually by means of an incline 40, so that the part 10 is securely held in the clip. These parts 10 are inserted rapidly as the chain moves along, each clip opening automatically as it comes to the point where the part is to be inserted and closing automatically as soon as the part is introduced. The clips are close together, so that a large number of articles may be simultaneously in the furnace, thereby utilizing fully the heat produced by the flames and securing economy of operation. At the final stage of their movement through the furnace the clips are released by means of an inclined cam or trip 41, similar to the trip 38, and the parts 10 drop through an opening 42 into a tempering-bath 43 or any other suitable receptacle.

The inner edges of the plate 4 5, adjoining the slot 20 in the top of the furnace, constitute tracks upon which the links slide along, each link being provided for this purpose with opposite runners 44. An overhead track 45, supported upon brackets 46, is also provided between the sprockets 29 and 30, and the links are provided with rolls 47, mounted upon the pins 28 to run upon said track 45. Each of the sprockets consists of a pair of flanges having suitable teeth to engage the ears 22 upon links. The shafts 48 of the sprockets turn upon roller-bearings 49, this being an advantage because of the impracticability of using ordinary lubricants, since the machine becomes very hot. The rollers 47 on the links also conduce to the easy operation of the machine notwithstanding the absence of lubricant, while the runners 44 slide easily along the tracks. Moreover, because the links run upon said tracks 4 and 5, the parts 10 are held in proper position to receive the action of the flames, while the links themselves are guided along in their proper relation to the slot. It will be seen at Fig. 2 that the links substantially fill said slot and at Fig. 1 that they fit so closely against one another as to form a practically solid wall, so that very little opening is left in the slot for the escape and waste of flame or heat.

In the form of link shown at Figs. 10 to 16 the projection or plate 23 is formed with a single recess $24^a$, in which lies a pair of clip arms or jaws $25^a$, each of considerable width, so as to substantially fill said recess. A single weighted arm 50, pivoted upon the pin 26 between the clips $25^a$, has opposite shoulders 51 to bear upon angular arms 52, formed upon the clip-jaws $25^a$, as seen at Fig. 11. The single wide recess $24^a$ accommodates plane-irons or other wide articles, while if it is desired to heat narrow articles at any time two of them may be placed edge to edge within said recess $24^a$ and be held by the jaws $25^a$. In this form of the invention, as well as the form seen at Figs. 4 to 9, inclusive, an opening 53 is left between the clips $25^a$ and the cooperating plate or projection 23, so that articles may be introduced downwardly into said opening, if desired, instead of upwardly, as at Fig. 1. It will be understood that the single weight 50 will hold both clips $25^a$ against either one or two articles placed within the recess $24^a$.

In order to prevent waste of heat, the left-hand end of the furnace or fire-chamber at Fig. 1 is closed by a plug 54, which may be made of refractory material. A handle 55 upon the plug enables the latter to be taken out and set in as required. It will be noticed that the clips release the articles 10 before this plug is reached and that the latter may completely close the end of the fire-chamber except for the top slot through which the links run. At the right-hand end of the fire-chamber is a plug 56, which is provided with a handle 57, whereby it may be removed for cleaning out the furnace, the plug 54 being removed for the purpose of giving access to the burners for lighting the same. The plug 56 of course has an opening 58, through which the articles 10 may enter; but otherwise it may be the same as plug 54.

Other variations may be resorted to within the scope of my invention and portions of my improvements may be used without others.

Having thus described my invention, I claim—

1. The combination of a furnace, an endless chain having clips each having a weighted arm, and obstructions at the ends of the furnace; each clip having a part to engage said obstructions and open the clip.

2. The combination of a furnace, a series of links each having thereon a movable clip for holding an object to be heated, means independent of said clips for connecting said links together to form an endless chain, sprockets over which the chain runs, means mounted between one sprocket and the furnace for engaging the clips to open them and permit them to close, and means for again engaging the clips to open them while approaching the opposite end of the furnace.

3. The combination of a furnace having a slot in its top extending the entire length of the furnace, an endless chain having clips mounted to pass through said slot and constructed to hold pendent objects to be heated, means to release the articles from the clips, and detachable plugs closing the ends of the furnace; one of said plugs having an opening through which the articles may enter the furnace, and the latter provided near its other end with an opening through which the released articles may drop.

4. The combination of a furnace having a slot in its top and extending the entire length of the furnace, an endless chain having clips to pass through said slot, sprockets whereon said chain is carried, and means for opening the clips.

5. The combination of a furnace provided with a refractory lining and having a slot in its top and extending the entire length of the furnace, an endless chain having clips to pass through said slot and extend down to the fire-chamber, sprockets above said furnace over which said chain runs, means between one sprocket and the furnace for opening the clips and permitting them to close, and means close to the opposite end of the furnace for opening the clips.

6. The combination of a furnace provided with a refractory lining and having a slot extending the entire length of the furnace; an endless chain having clips to pass through said slot and extend to the fire-chamber; and means for opening and closing the clips.

7. The combination of a furnace provided with a refractory lining and having in its top a slot extending the whole length of the furnace; an endless chain having clips to pass through said slot and extend to the fire-chamber; means at the entrance to the furnace for causing the clips to close and means for causing the clips to open as they approach the egress end of the furnace; the latter provided at said egress end with an opening in its floor through which the objects may fall.

8. The combination of a furnace, an endless chain, devices over which said chain runs, a gravity-arm pivoted to each link of the chain, and means upon each link to coöperate with said arm to form a clip to hold an article to be heated.

9. The combination of a furnace having in its top a slot extending the entire length of the furnace, an endless chain, devices over which said chain runs, each link of the chain having a depending member which travels through said slot, and a gravity-arm pivoted upon each link and having a depending member to coöperate with the first depending member to form a clip for holding an article to be heated.

10. The combination of a furnace having in its top a slot extending the entire length of the furnace, an endless chain, devices over which said chain runs, each link of the chain having a depending member which travels through said slot, and a gravity-arm pivoted upon each link and projecting from said link over the top of the furnace, and having a depending member to coöperate with the first depending member to form a clip for holding an article to be heated.

11. The combination of a furnace having in its top a slot extending the entire length of the furnace, an endless chain, devices over which said chain runs, each link of the chain having a depending member which travels through said slot, a gravity-arm pivoted upon each link, and projecting from said link over the top of the furnace, and having a depending member to coöperate with the first to form a clip for holding an article to be heated; and devices mounted at the ends of said furnace for lifting the gravity-arms to release the articles from the clips.

12. The combination of a furnace having in its top a slot extending the entire length of the furnace, tracks upon each side of said slot, and an endless chain whose links run upon said tracks; each link having a clip member which extends down into said slot, and also having a pivoted member coöperating with said clip member, said pivoted member provided with a gravity-arm which overhangs one of said tracks.

13. The combination of a furnace having in its top a slot extending the entire length of the furnace, an endless chain each of whose links has a clip to extend into said slot to hold an article to be heated, a track extending along said slot to support said links, sprockets over which said chain runs, rolls upon said links, and a track upon which said rolls run during the return travel of the links.

14. The combination of a furnace, a chain consisting of links, each link having at each end a pair of ears, upon its opposite sides, each link hinged to the next by means of pins in said ears, rolls mounted upon said pins, a pair of sprocket-wheels over which said chain runs, each sprocket-wheel having toothed flanges to engage said ears, said furnace having in its top a slot extending the entire length of the furnace, and tracks bordering said slot upon which said links run, and an overhead track between said sprockets upon which said rolls run during the return movement of the links; each link having a gravity-clip pivoted thereto and extending down into said slot, and means being provided for enabling the movement of the chain to open said clips one after another.

15. The combination of a furnace provided with a refractory lining and having in its top a slot extending the entire length of the furnace, a row of transverse burners for mixed air and fuel extending along the furnace at the upper part of the fire-chamber so that the flames are directed across the furnace immediately beneath said slot, an endless chain having means extending down into said slot to hold articles to be heated, said chain substantially filling the slot, and means for causing said chain to travel along said slot.

16. The combination of a furnace provided with a refractory lining and having in its top a slot extending the entire length of the furnace, two rows of burners for mixed air and fuel extending along the furnace one row in each side thereof at the upper part of the fire-chamber so that the flames are directed oppositely across the furnace beneath said slot, an endless chain having clips extending down into said slot to hold articles to be heated, means over which said chain runs, and means for releasing the clips *seriatim*.

17. The combination of a furnace provided with a refractory lining and having in its top a slot extending the entire length of the furnace, two double rows of burners for mixed air and fuel extending along the furnace, one double row in each side thereof at the upper part of the fire-chamber so that the flames are directed oppositely across the furnace beneath said slot, each double row consisting of two tiers of burners, the burners in one tier alternating with those in the other tier, an endless chain having clips extending down into said slot to hold articles to be heated, sprockets over which the chain runs, and means for causing the movement of the chain to release the clips *seriatim*.

18. The combination of a furnace provided with a refractory lining and having in its top a slot extending the entire length of the furnace, two double rows of burners for mixed air and fuel extending along the furnace, one double row in each side thereof at the upper part of the fire-chamber so that the flames are directed oppositely across the furnace beneath said slot, each double row consisting of two tiers of burners, the burners in one tier alternating with those in the other tier, four mains without said furnace to which said burners are attached, one main for each tier of burners, means extending into said slot for holding articles to be heated, and means for causing said holding means to travel through the slot.

19. The combination of a furnace provided with a refractory lining and having in its top a slot extending the entire length of the furnace, two double rows of burners for mixed air and fuel extending along the furnace, one double row in each side thereof at the upper part of the fire-chamber so that the flames are directed oppositely across the furnace beneath the slot, each double row consisting of two tiers of burners, the burners in one tier alternating with those in the other tier, an upper and a lower main without said furnace and extending along each side thereof, one main for each tier of burners; the upper mains having straight connections direct to the upper tiers of burners, and the lower mains having elbow connections to their burners; and means traveling through said slot for holding articles to be heated.

20. The combination of a furnace having a slot extending the entire length of the furnace, and a series of connected links mounted to travel through said slot, said links formed and mounted so as to abut together and form a substantially complete filling for the slot in such a manner as to prevent escape of flame from the slot; each link having means for releasably holding an article to be heated in such a manner that the article is supported within the body of the furnace.

21. The combination of a furnace, an endless chain, devices over which said chain runs, a plurality of arms pivoted to each link of the chain, and means for each link to coöperate with said arms to form a plurality of clips to hold articles to be heated.

22. The combination of a furnace having a slot extending the entire length of the furnace, an endless chain, devices over which said chain runs, each link of the chain having a projection which travels through said slot, and a plurality of gravity-arms independently pivoted upon each link and each having a member to coöperate with said projection to form a clip for holding an article to be heated.

23. The combination of a furnace having in its top a slot extending the entire length of the furnace, an endless chain, devices over which said chain runs, each link of the chain having a depending member which travels through said slot, and a plurality of gravity-arms pivoted upon each link and projecting from said link over the top of the furnace, and having depending members to coöperate with the first depending member to form clips for holding articles to be heated.

24. The combination of a furnace having in its top a slot extending the entire length of the furnace, an endless chain, devices over which said chain runs, each link of the chain having a depending projection which travels through said slot, a plurality of independent gravity-arms pivoted upon each link and projecting from said link over the top of the furnace, and each having a depending member to coöperate with said projection to form a clip for holding an article to be heated; and a device mounted at the end of said furnace for lifting the gravity-arms *seriatim* to release the articles from the clips.

25. The combination of a furnace having in its top a slot extending the entire length of the furnace, tracks upon the top of said furnace, at each side of said slot, an endless chain, and sprockets over which said chain runs, the links of the chain having bearings which rest upon said tracks along the opposite edges of said slot, and each link having pivoted thereon a plurality of independent clips which extend down into said slot to carry articles to be heated, said chain so constructed that it substantially fills said slot, to minimize the escape of heat therefrom.

26. The combination of a furnace having in its top a slot extending the entire length of the furnace, tracks upon each side of said slot, and an endless chain whose links run upon said tracks; each link having an integral projection which extends down into said slot, and also having a plurality of pivoted members coöperating with said projection, each of said pivoted members provided with a gravity-arm which overhangs one of said tracks.

27. The combination of a furnace having a slot extending its entire length, an endless chain having links each provided with a projection within said slot, each projection having a series of recesses, pivoted clip-arms in the recesses upon each link, a sprocket over which said chain runs, and means for turning said sprocket.

28. The combination of a furnace having in its top a slot extending the entire length of the furnace, an endless chain each of whose links has a projection extending into said slot, each projection having a recess, a clip member lying in said recess and having a gravity-arm, said recess open at the top to permit the downward introduction of an article to be heated, and means over which said chain runs.

29. The combination of a furnace having in its top a slot which extends the entire length of the furnace, a track upon the top of said furnace near said slot, an endless chain having links which ride upon said track, each link having a clip which extends down into said slot, sprockets at the ends of the furnace, and an upper track to support the returning links, said links having rolls to run upon said upper track, and said clip including a pivoted member having a weighted arm projecting over the top of the furnace.

30. The combination of a furnace, having a slot throughout its length, a chain consisting of links, each link having at each end a pair of ears upon its opposite sides, each link hinged to the next by means of said ears, a pair of sprocket-wheels over which said chain runs, each sprocket-wheel comprising a pair of toothed flanges to engage said ears, a projection upon each link extending into said slot, a clip member pivoted upon each link to coöperate with each projection, and means for causing the movement of the chain to release the clip members one by one.

31. The combination of a furnace, a chain consisting of links, each link having at each end a pair of ears upon its opposite sides, each link hinged to the next by means of pins in said ears, rolls mounted upon said pins, a pair of sprocket-wheels over which said chain runs, each sprocket-wheel having toothed flanges to engage said ears, said furnace having in its top a slot extending the entire length of the furnace, and tracks bordering said slot upon which said links run, an overhead track between said sprockets upon which said rolls run during the return movement of the links; each link having a projection extending down into said slot, a series of gravity-clips pivoted upon each link and coöperating with said projection, and means for enabling the movement of the chain to open said gravity-clips one after another.

32. The combination of a furnace provided with a refractory lining and having in its top a slot extending the entire length of the furnace, a row of burners for mixed air and fuel extending along the furnace at the upper part of the fire-chamber so that the flames are directed across the furnace beneath said slot, an endless chain each of whose links has a projection extending down into said slot, each projection provided with recesses, clip-arms pivoted in said recesses, to hold the articles to be heated, each of said recesses remaining open at the top to permit downward introduction of the articles, means for causing said chain to travel along said slot, and means for opening the clips *seriatim*.

33. The combination of a furnace provided with a refractory lining and having a slot extending the entire length of the furnace, a set of burners for mixed air and fuel extending along the furnace, an endless chain having clips extending into said slot to hold articles to be heated, and means over which said chain runs; removable plugs closing the ends of said furnace, and one of said plugs having an opening through which the articles may enter the furnace.

34. The combination of a furnace provided with a refractory lining and having a slot extending the entire length of the furnace, a set of burners extending along the furnace, an endless chain having clips extending into said slot to hold articles to be heated, means over which said chain runs, and means for automatically releasing the articles near one end of the furnace; said end being closed by a detachable plug, and an opening provided in the bottom of the furnace through which the articles may drop.

35. The combination of a furnace provided with a refractory lining and having a slot extending the entire length of the furnace in the top thereof; a set of burners extending along the furnace; an endless chain having clips extending down into said slot to hold articles to be heated; means over which said chain runs; said links formed and mounted so as to form a substantially solid filling for said slot; and a plug in one end of the furnace and detachable therefrom; means being provided within the furnace near said plug for releasing the articles from the clips.

36. The combination of a furnace provided with a refractory lining and having a slot extending the entire length of the furnace, a set of burners for mixed air and fuel extending along the furnace, an endless chain having clips extending into said slot to hold articles to be heated, and means over which said chain runs; said links being formed and mounted so as to form a substantially solid filling for said slot, whereby the flames from the burners are confined within the fire-chamber.

37. The combination of a furnace having a slot extending the entire length of the furnace, and a series of connected links mounted to travel through said slot, said links formed and mounted so as to abut together and form a substantially complete filling for the slot in such a manner as to prevent escape of flame from the slot; each link having a plurality of independently-mounted devices for releasably holding a plurality of articles to be heated.

38. The combination of a furnace provided with a refractory lining and having in its top a slot extending the entire length of the furnace, an endless chain each of whose links has a projection extending down into said slot and provided with a plurality of clips to hold articles to be heated, and means over which said chain runs; said links and clips being formed and mounted so as to form a substantially solid filling for said slot, whereby the flames are confined within the fire-chamber.

GEORGE MACHLET.

Witnesses:
SAMUEL R. OGDEN,
PHILIP C. OSTERMAN.